US012670182B1

(12) United States Patent (10) Patent No.: US 12,670,182 B1
Chandorkar et al. (45) Date of Patent: Jun. 30, 2026

(54) APPLYING OPERATIONS TO REPLICAS OF A GLOBAL TABLE BASED ON HOMING RULES AND ITEM ATTRIBUTE VALUES

(71) Applicant: Amazon Technologies, Inc., Seattle, WA (US)

(72) Inventors: Sanket Vishram Chandorkar, Renton, WA (US); Sharatkumar Nagesh Kuppahally, Issaquah, WA (US); Alexander Richard Keyes, Seattle, WA (US); Shitanshu Aggarwal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/979,421

(22) Filed: Dec. 12, 2024

(51) Int. Cl.
*G06F 16/27* (2019.01)
*G06F 16/22* (2019.01)
(52) U.S. Cl.
CPC .......... *G06F 16/27* (2019.01); *G06F 16/2282* (2019.01)

(58) Field of Classification Search
CPC ....................................................... G06F 16/27
USPC ......................................................... 707/802
See application file for complete search history.

(56) References Cited

U.S. PATENT DOCUMENTS

| | | | |
|---|---|---|---|
| 8,667,001 B2 | 3/2014 | Dinker et al. | |
| 2006/0190497 A1* | 8/2006 | Inturi | G06F 16/213 |
| 2019/0155937 A1* | 5/2019 | Barve | G06F 16/2365 |
| 2020/0394208 A1 | 12/2020 | Bormann et al. | |
| 2021/0081433 A1* | 3/2021 | Vig | G06F 16/2272 |
| 2024/0045887 A1* | 2/2024 | VanBenschoten | G06F 16/2379 |

* cited by examiner

*Primary Examiner* — Muluemebet Gurmu
(74) *Attorney, Agent, or Firm* — S. Scott Foster; Kowert, Hood, Munyon, Rankin & Goetzel, P.C.

(57) ABSTRACT

Systems and methods are disclosed to implement, in a database service, applying operations to replicas of a global table based on homing rules and item attribute values. In embodiments, an instance of a database service may receive, from a client, a request to write an item to a global table. The instance may store the item at one or more replica tables at one or more different regions based a homing rule for the global table and one or more attribute values of the item.

20 Claims, 6 Drawing Sheets

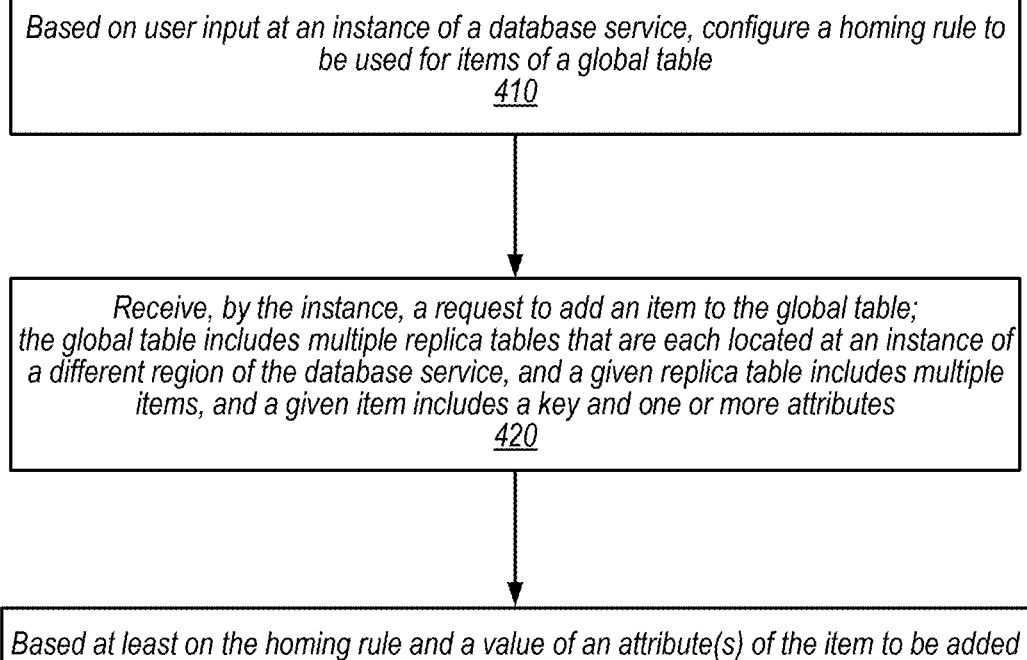

*Based on user input at an instance of a database service, configure a homing rule to be used for items of a global table*
*410*

*Receive, by the instance, a request to add an item to the global table; the global table includes multiple replica tables that are each located at an instance of a different region of the database service, and a given replica table includes multiple items, and a given item includes a key and one or more attributes*
*420*

*Based at least on the homing rule and a value of an attribute(s) of the item to be added to the global table, cause the item to be added to one or more of the replica tables at one or more of the regions; the homing rule indicates that the item is to exist at the one or more regions and that the item is not to exist at one or more other regions*
*430*

FIG. 4

*Receive, at an instance of a database service, an indication of a change to a homing rule for an item of a global table*
*510*

*Update the homing rule for the item based on the indicated change*
*520*

*Update the replica tables of the global table based on the updated homing rule for the item*
*530*

APPLYING OPERATIONS TO REPLICAS OF A GLOBAL TABLE BASED ON HOMING RULES AND ITEM ATTRIBUTE VALUES

Commoditization of computer hardware and software components has led to the rise of service providers that provide computation and storage capacity as a service. High throughput and availability demands have driven these services to become more distributed on a geographical scale. Different approaches to the replication of data distributed geographically have resulted in significant challenges in complexity, availability, and performance.

In some database systems, a replication process may be implemented using replica tables in the multiple regions. For example, a database system may manage different replica tables that correspond to one global table in order to maintain a global view data across different data centers located at different geographic regions. When replica tables are being used in such a configuration, it is difficult to comply with restrictions that limit certain types of data to certain regions. Techniques to manage different types of data restrictions at different regions are needed to ensure the replication process complies with such restrictions while minimizing resources used to comply with different restrictions.

BRIEF DESCRIPTION OF THE DRAWINGS

FIG. 4 is a flowchart illustrating a process of applying operations to replicas of a global table based on item homing rules and item attribute values, according to some embodiments, according to some embodiments.

Figure 1:
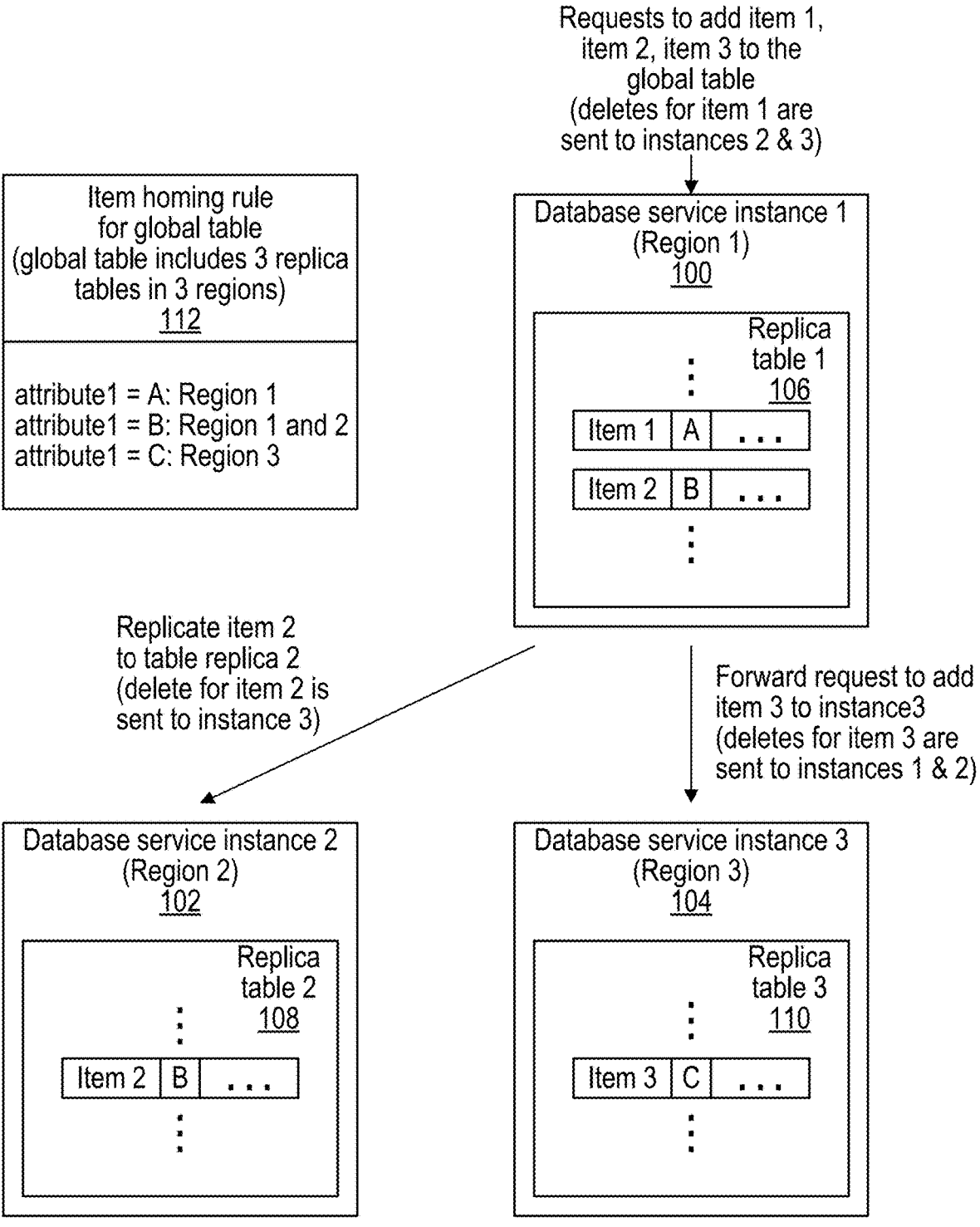
FIG. 1 is a block diagram illustrating an example database service that implements applying operations to replicas of a global table based on item homing rules and item attribute values, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement applying operations to replicas of a global table based on item homing rules and item attribute values, according to some embodiments.

In some embodiments, a database service may allow users to create a global table that includes a group of replica tables maintained at different geographic locations or regions by different instances of the database service. In some embodiments, these replica tables are hosted on distinct hardware (e.g. database servers) and/or software (e.g. database instances) at the different locations. In some embodiments, the same location may include two or more of the replica tables (e.g., hosted on the same database server and/or the same database instance). In some embodiments, an instance of a database service may include any hardware and/or software used to implement the instance. In some embodiments, the replica tables may be used to support an ongoing replication process to replicate data among one other. For example, in some embodiments, replica tables may be configured to forward changes in one replica to other replicas of the global table based on a data homing rule, so that the global table can provide a up-to-date view of data in all regions, while also complying with the homing rule. In this manner, the global table allows database users in different regions to easily share a body of data that is readable and writable from any region, while also complying with any region-specific data restrictions.

In some embodiments, a database system may be implemented as a database service in a cloud-based service provider network, which hosts database instances on behalf of their clients using "in the cloud" hardware operated by the service provider. In some embodiments, the database service may provide publicly accessible interfaces to clients (e.g. via a public network such as the Internet), to allow the clients to both access the data in their hosted database instances, and manage metadata properties of the database service (e.g., the definition of database tables, configuring homing rules, etc.).

Advantageously, embodiments of the database service and service management interface disclosed herein may be used to enforce a homing rule across the different replicas of a global table and to minimize resources used to comply with different restrictions (e.g., reducing or eliminating the amount of custom code used by different clients to enforce data restrictions in different regions). These and other features and benefits of the global table management interface are described in further detail below, in connection with the figures.

FIG. 1 is a block diagram illustrating an example database service that implements applying operations to replicas of a global table based on item homing rules and item attribute values, according to some embodiments.

As shown, the figure depicts three instances of a database service: instance 1 100 hosted at region 1 (e.g., as part of a service provider's network that implements the database service across different regions), instance 2 102 hosted at region 2, and instance 3 104 hosted at region 3. As shown, instance 1 100 includes replica table 1 106 of a global table, instance 2 102 includes replica table 2 108 of the global table, and instance 3 110 includes replica table 3 of the global table.

In embodiments, the database service stores item an item homing rule 112 for the global table. The item homing rule 112 includes different sub-rules that apply to different regions (e.g., different replica tables) that implement the global table. As shown, one sub-rule specifies that if attribute 1 of an item to be added (e.g., written) to the global table is "A" then the item (or attribute value(s) of the item) is to exist in region 1 (e.g., replica table 1 106) and not to exist in region 2 (e.g., replica table 2 108) or region 3 (e.g., replica table 3 110). Therefore, any request to write an item to the global table that matches "A" as the value for attribute 1 will cause the service (e.g., the instance that received the request and/or other instances) to only add the item (or attribute value(s) of the item) to replica table 1 106 of region 1. As shown, instance 1 100 receives a request to add item 1 to the global table and in response, the instance adds item 1 to replica table 1 106 of region 1, based on the homing rule and the value for attribute 1 of item 1.

In embodiments, an item homing rule may include any number of rules ("sub-rules") that may be applied for an item to be added to a global table (e.g., logical expressions and/or conditional expressions), where each sub-rule applies to any combination of one or more attribute values of the item in order to determine one or more regions that the item is to exist in and/or not to exist in. For example, the database service may evaluate the expression "attribute 1 =B" to be true for a particular item and in response to evaluating the expression to be true, the database service may store the item at replica table 1 of region 1 as well as replica table 2 of region 2, but the item is not stored at any other replica tables. As described herein, a homing rule may include any number of sub-rules, where each sub-rule defines a logical relationship between any number of different attributes (based on the value of the attributes) in order to determine regions/replicas in which an item is to be stored (e.g., the database service applies the logic defined by the homing rule in order to determine the regions to add the item to).

In embodiments, an item to be added to the global table may include any number of attributes (attribute1, attribute2, etc.). In some embodiments, the database service may allow the homing rule to be modeled as a query language, while in other embodiments the homing rule may be modeled as a user defined function. In some embodiments, the homing rule may be modeled based on indirection, in which an attribute of an item points to another lookup table that dictates the replica membership of the item (e.g., indicates which table replica(s) the item should exist in).

Although the example shows a homing rule based on a value of the first attribute of an item (attribute1), in various embodiments any attribute may be used. Furthermore, in various embodiments any combination of any number of attributes and/or logic may be used for a given homing rule (e.g., if attribute3_city= "Dublin" and attribute4 zone= "EU" then the item is to exist in region 3 only; if attribute5_region= "us-cast-1" and attribute6_price >10, then the item is to exist in region 2 and region 3). Although the depicted example shows three regions, in various embodiments a global table may include any number of replica tables that are each hosted in a different region.

In the depicted example, another rule specifies that if attribute 1 of an item to be added to the global table is "B" then the item (or attribute value(s) of the item) is to exist in both region 1 and region 2 (e.g., replica table 1 106 and replica table 2 108) and not to exist in region 3 (e.g., replica table 3 110). Therefore, any request to write an item to the global table that matches "B" as the value for attribute 1 will cause the service (e.g., the instance that received the request and/or other instances) to only add the item (or attribute value(s) of the item) to replica table 1 106 of region 1 and replica table 2 108 of region 2. As shown, instance 1 100 receives a request to add item 2 to the global table and in response, the instance adds item 2 to replica table 1 106 of region 1 and replicates item 2 to from replica table 1 to replica table 2, based on the homing rules and the value for attribute 1 of item 2.

As depicted, another rule specifies that if attribute 1 of an item to be added to the global table is "C" then the item (or attribute value(s) of the item) is to exist in region 3 (e.g., replica table 3 110) and not to exist in region 1 (e.g., replica table 1 106) or region 2 (e.g., replica table 2 108). Therefore, any request to write an item to the global table that matches "C" as the value for attribute 1 will cause the service (e.g., the instance that received the request and/or other instances) to only add the item (or attribute value(s) of the item) to replica table 3 110 of region 3.

As shown, instance 1 100 receives a request to add item 3 to the global table and in response, instance 1 forwards the request to add item 3 to service instance 3 104. In embodiments, instance 3 then sends a delete for item 3 to instances 1 and 2, in order to ensure that item 3 does not exist in region 1 and 2. In some embodiments, after instance 1 100 receives a request to add item 3 to the global table, instance 1 adds item 3 to replica table 1, then replicates item 3 from replica table 1 to replica table 3 110 of region 3, and then deletes item 3 from replica table 1 (a delete may also be sent to instance 2, to ensure item 3 also does not exist in region 3). In some embodiments, instance 1 100 would reject the request and would return information to client, for the client to make the call to instance 3 instead.

In some embodiments, when the database service adds an item to one or more replica tables based on a homing rule, the service also sends deletes to each of the remaining tables in order to ensure that the item does not exist in the remaining tables. For example, if attribute 1 is "A" for item 1, then deletes for item 1 are sent from instance 1 to instances 2 and 3. Similarly, if attribute 1 is "B" for item 2, then a delete for item 2 is sent from instance 1 to instance 3. By sending deletes to the remaining tables, the database service ensures that the items of the global table remain in a consistent state and converge on the same version of the item across regions.

In embodiments, when an item is added to a global table, a key for the item and a timestamp may be replicated to each of the replica tables, regardless of what the homing rules specify for the item. In the above example of adding item 2 to replica table 1 106 of region 1 and replica table 2 108 of region 2, the service may also add an entry to replica table 3 (e.g., by sending a delete for item 2 to replica table 3) that includes the key for item 2 (e.g., "Item 2" or some other key) and a timestamp corresponding to the time the delete was sent, but without including the attribute value "B" in the entry and/or without including any number of other attribute values of item 2 (the entry may be considered a "tombstone" entry for item 2, since it does not include the value for the attribute(s) for item 2). For example, a null value may be used for attribute1 or another value other than "B" (the same may be done for any number of other attribute values of item 2). In embodiments, this may allow each replica table to have the same number of entries and/or keys, while still adhering to the homing rules to restrict data to certain regions. In embodiments, the key for any given item may uniquely identify that item with respect to any other items of the global table (a key for an item is unique for an item and tombstone for the item). In various embodiments, the keys may be sent in plain text or in in a hash format (e.g., encrypted format) across regions.

In some embodiments, when an item is replicated to a replica table and an entry for the item already exists at the replica table (either as a tombstone item or as an item with values), then the version of the item with the most recent timestamp is used. If the item that already exists has the most recent timestamp, then it is not overwritten; otherwise, the replicated version is used to overwrite the existing version. This may apply for replicating deletes for an item as well. If the item that already exists in the replica table has the most recent timestamp, then it is not deleted (e.g., not changed to a tombstone item); otherwise, the delete for the item is replicated and the existing version of the item is overwritten/ changed to be a tombstone item. By only accepting items or deletes for items based on the most recent timestamp, the global table remains in a consistent and most up-to-date state.

In various embodiments, the database service stores item homing rules 112 in any number of instances and/or regions that host a replica table of the global table. In an embodiment, each instance and/or region of the database service stores a copy of the item homing rules, allowing local access to the homing rules by a given instance. In embodiments, any changes to the item homing rules are updated for each copy at each instance in real-time or near real-time, in order for the item homing rules to be the same across all the regions.

In some embodiments, the service may receive, via a management interface, an indication of a change to a homing rule (e.g., a change to the conditional logic for one or more sub-rules). The service may update the homing rule based on the indicated change and update one or more (or all) of the replica tables based on the updated homing rule (e.g., adding or removing an item for one or more tables). In an embodiment, for each replica table, the service may determine whether an item is to exist at the replica table based on the updated homing rule (and based on values of one or more attributes of the item). If so, then the item is added to the replica table (if not already present) and if not, then a delete is sent to the replica table.

In some embodiments, when one or more attribute values of an item are changed/updated, then the item may be removed and/or added for any number of replica tables (e.g., in any number of corresponding regions), so that the updated item exists in the replica tables as indicated by the homing rule and the updated attribute value(s) of the item. In the depicted example, if the value for attribute 1 of item 2 is changed from "B" to "C" based on an update request received at instance 1, then the database service may delete item 2 from replica table 1 (creating a tombstone entry for item 2 in replica table 1), send a delete for item 2 to replica table 2 (creating a tombstone entry for item 2 in replica table 2), and replicate item 2 to replica table 3, so that the data for item 2 only exists in replica table 3 (with the value "C" for attribute1).

Figure 2:
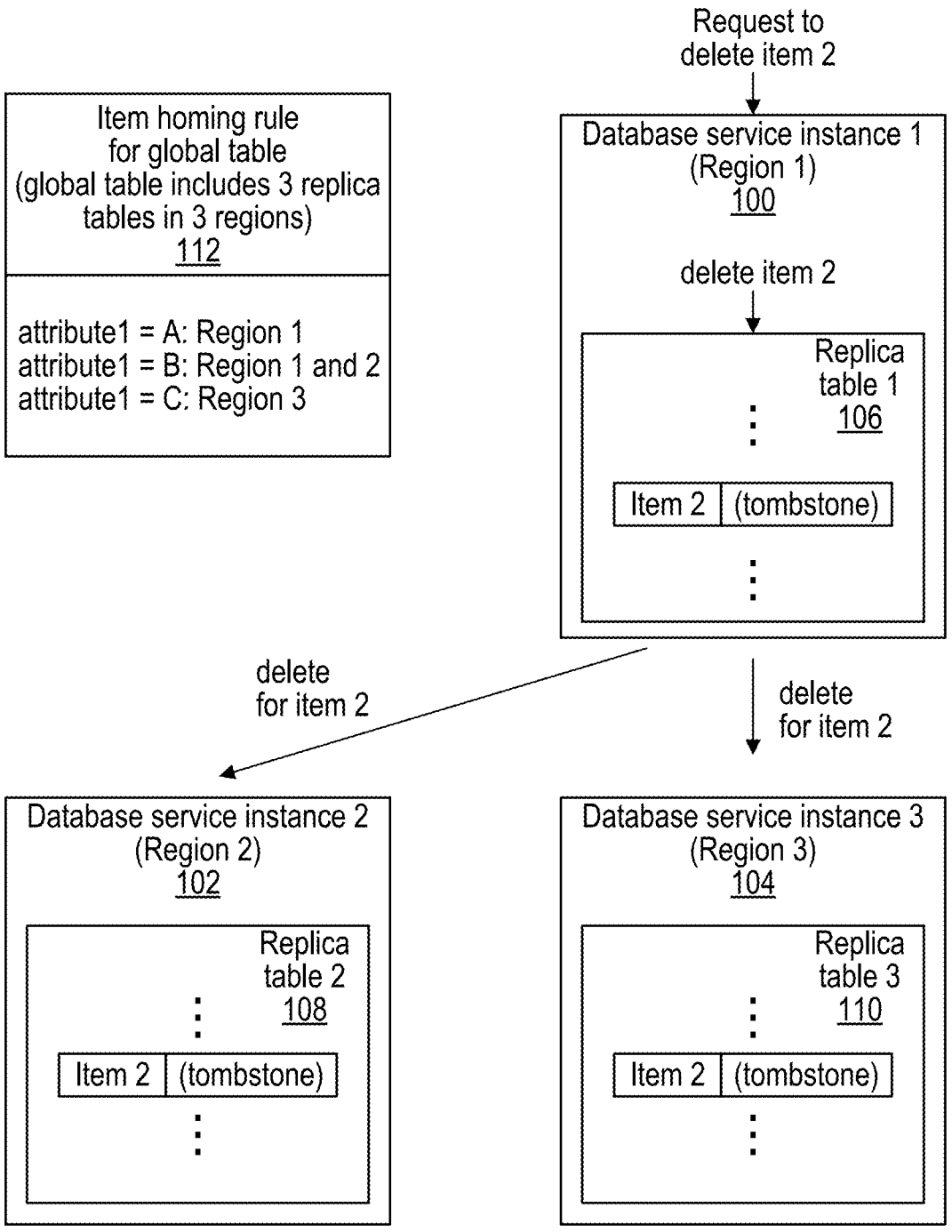
FIG. 2 is a block diagram illustrating an example database service that implements applying operations to replicas of a global table based on item homing rules and item attribute values, according to some embodiments.

FIG. 2 is a block diagram illustrating an example database service that implements applying operations to replicas of a global table based on item homing rules and item attribute values, according to some embodiments.

As shown, the figure depicts the three instances of the database service of FIG. 1: instance 1 100 hosted at region 1 (e.g., as part of a service provider's network that implements the database service across different regions), instance 2 102 hosted at region 2, and instance 3 104 hosted at region 3. As shown, instance 1 100 includes replica table 1 106 of a global table, instance 2 102 includes replica table 2 108 of the global table, and instance 3 110 includes replica table 3 110 of the global table. The example also includes the homing rules 112 for the global table, as in FIG. 1.

As shown in the depicted example, the database service (instance 1 100) receives a request to delete item 2 from the global table and in response, the instance deletes item 2 from replica table 1 and sends deletes for item 2 to all of the other instances as well (instance 2 and 3), regardless of where the homing rule indicates the item should exist. This ensures that the item data is deleted for each replica, resulting in a consistent state for the global table. In this example, a tombstone for item 2 (which may include a timestamp for the delete) remains in each replica.

In some embodiments, the database service (instance 1 100) receives a request to delete item 2 from the global table and in response, the instance deletes item 2 from replica table 1 and, based on the item homing rules (e.g., the second homing rule indicates that item 2 also exists at region 2 because the rule specifies the item is to exist in region 1 and 2), replicates the delete for item 2 to from replica table 1 100 to replica table 2 108 (e.g., sends/forwards the request to delete item 2 to instance 2, but without sending a delete for item 2 to instance 3), resulting in deletion of item 2 from replica table 2 108. In embodiments, this may be used to reduce/limit the network traffic.

Figure 3:
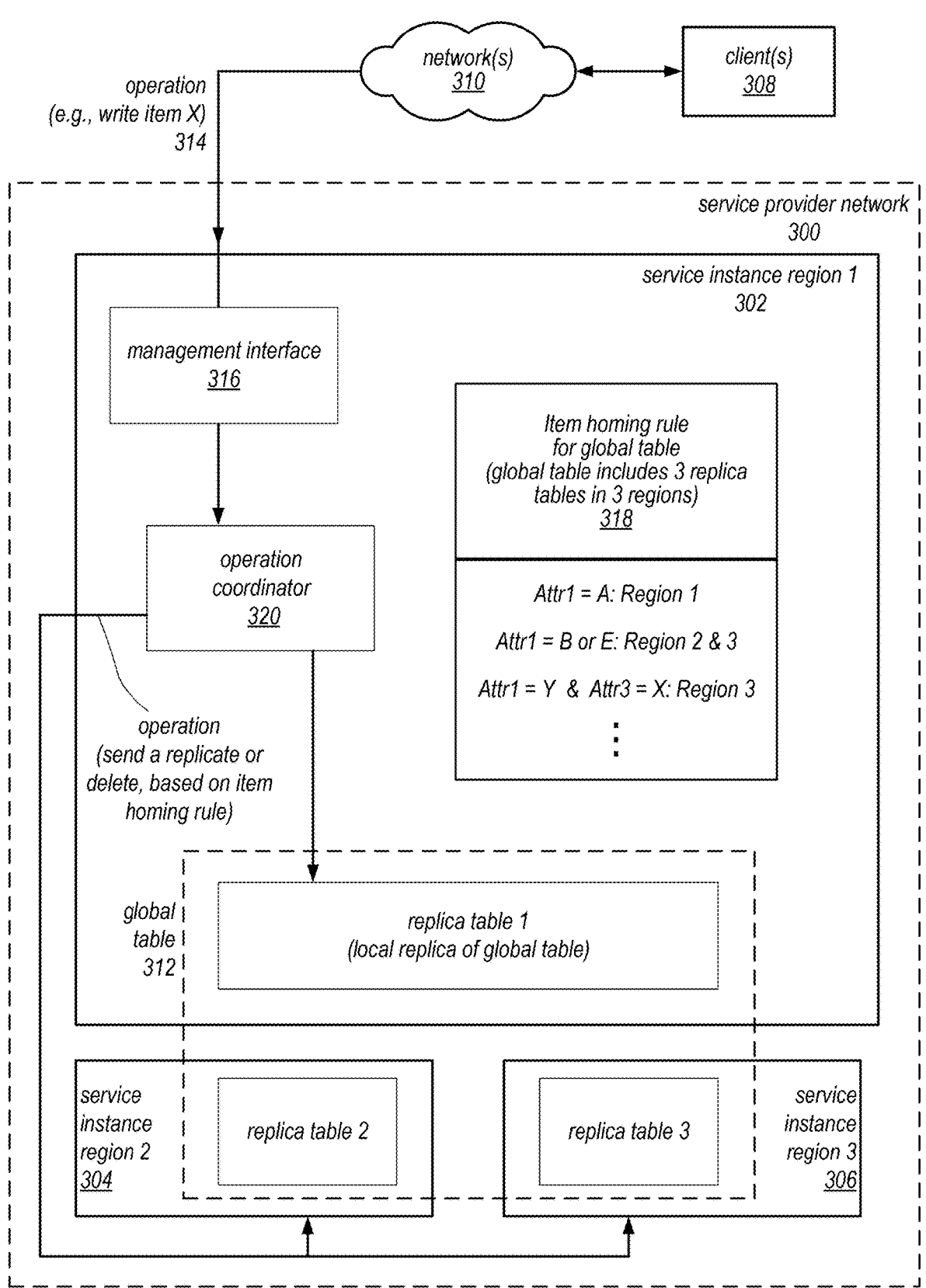
FIG. 3 is a block diagram illustrating an example database service that implements applying operations to replicas of a global table based on item homing rules and item attribute values, according to some embodiments.

FIG. 3 is a block diagram illustrating an example database service that implements applying operations to replicas of a global table based on item homing rules and item attribute values, according to some embodiments.

As shown, the figure depicts a service provider network 300 that implements a database service across multiple locations, by implementing service instance 302 at region 1, service instance 304 at region 2, and service instance 306 at region 3. As may be understood, in different embodiments, the database system may be implemented across a large number of different locations. In some embodiments, each location may be a different geographical location of a distributed system. In some embodiments, each location may be a different data center located at a particular geographic zone within a distributed network of data centers. In some embodiments, each location may be a distinct sub-network (e.g. a local area network or LAN) that are connected to the other network locations, but whose network elements are not generally accessible outside of the network. In some embodiments, each location may each host a separate instance of the database service or system. In some embodiments, the database service may be accessed by clients 308 at each of regions 1, 2 or 3, via one or more networks 310.

In some embodiments, the client(s) may encompass any type of client configurable to submit service requests to the database system, which may be implemented in a service provider network. In some embodiments, a client may include a suitable version of a web browser or a plug-in module for a web browser, or other type of code module configured to execute as an extension to or within an execution environment to provide database or data storage service clients (e.g., client applications, users, and/or subscribers) access to the services provided by provider network.

Alternatively, a client may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client may be an application configured to interact directly with the services. In some embodiments, a client may be configured to generate web service requests according to a REST-style web services architecture, a document- or message-based web services architecture, or another suitable web services architecture.

In some embodiments, the network 310 may be a public network such as the Internet. In some embodiments, the client(s) 308 may lease different amounts of computing resources for one or more services provided by the service provider network 300, such as a serverless execution service. In some embodiments, the service provider network 300 may operate a large number of computing stems that may be provisioned and de-provisioned on demand to support the operations of its services.

The services may be implemented using one or more service endpoints configured to receive and process services requests. The services may be implemented using hardware and/or software to properly receive and process HTTP-based web services requests directed to their endpoints. In one embodiment, the services may be implemented as a server system configured to receive web services requests from clients and to forward them to various components that collectively implement a data storage system, serverless execution system, table storage system, etc., for processing. In other embodiments, the services may be configured as a number of distinct systems (e.g., in a cluster topology) implementing load balancing and other request management features configured to dynamically manage large-scale web services request processing loads.

In some embodiments, as shown, the database service may receive data access operations or data table management operations via a network 310. In various embodiments, the network may encompass any suitable combination of networking hardware and protocols necessary to establish network communications between clients 308 and database system. For example, network 310 may encompass the various telecommunications networks and service providers that collectively implement the Internet. Network 310 may also include private networks such as local area networks (LANs) or wide area networks (WANs) as well as public or private wireless networks. For example, both a given client 308 and database may be respectively provisioned within enterprises having their own internal networks. In such an embodiment, network 310 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and the database system.

In some embodiments, clients 308 may communicate with network-based database using a private network rather than the public Internet. For example, a client may be provisioned within the same enterprise as the database and/or the underlying system described herein. In some embodiments, a client may comprise a service that is offered by the same service provider that offers the database as a service.

As shown, in the depicted embodiment, the client 308 is configured to issue operations (write item, delete item, etc.) on database tables in the database system, such as operation 314 directed to global table 312. In this example, replication table 1 is a local regional replica table that is part of a global table 312. As shown, global table 312 in this example is composed of three regional replica tables 1, 2, and 3, which are maintained at the three different locations region 1, 2, and 3.

In some embodiments, the database system may implement a managed replication process among the replica tables 1, 2 and 3, in order to maintain a consistent view of at least some data across the replica tables, while restricting items data based on homing rules. In some embodiments, the replication process may involve performing, at each location, sending data changes received at that location to the other locations, and receiving and applying data changes from the other locations to the local replica table. In some embodiments, the sending and receiving of data changes may be performed using an update stream that indicates a sequence of data changes that have been applied to an individual replica table. In some embodiments, each of the replica tables 1, 2, and 3 may be writable, so that the global table may be updated from any of the three regions 1, 2, and 3.

In some embodiments, as shown, an operation 314 may be received via management interface 316. In some embodiments, the management interface 316 may be provided by the database service to allow clients to specify a variety of operations. In some embodiments, the management interface may be implemented as a set of invocable function calls, which may be for example web service calls. In some embodiments, the management interface may be implemented as a programmatic interface, for example, an application programming interface or API. In some embodiments, the management interface may be implemented as a user interface, such as a command line interface (CLI) or a graphical user interface (GUI). In some embodiments, the management interface may be implemented as a network protocol exposed by the database system.

For example, in some embodiments, such operations may allow the user to write an item to the global table. To do so, the service instance (e.g., operation coordinator 320) may write the item to one or more of the replica tables and send deletes to remaining tables, based on an item homing rule, as described for FIG. 1. In embodiments, the operation coordinator 320 may write the item to replica table 1 and propagate/replicate the write to replica table 2 and/or 3, based on item homing rule 318 and a value of an attribute(s) of the item. In the example, the item homing rule specifies that if attribute 1 of an item is A, then the item is to exist in region 1 only; if attribute 1 of an item is B or E, then the item is to exist in region 2 and 3; and if attribute 1 of an item is Y and attribute 3 of an item is X, then the item is to exist in region 3 only. Although this example describes three example sub-rules, in various embodiments a homing rule may include any number of sub-rules, where each sub-rule may include conditional logic for any combination of any number of different attributes (e.g., based on the values of each attribute).

In embodiments, the operation coordinator 320 may apply an item homing rule to store an item to any number of replica tables at different regions of a global table and/or to delete an item from any number of replica tables at different regions of a global table (e.g., based on receiving a request to write the item to the global table or a request to delete the item from the global table). In some embodiments, the operation coordinator 320 may apply an item homing rule to store an item to any number of replica tables at different regions of a global table and/or to delete an item from any number of replica tables at different regions of a global table based on receiving a request to update the item of the global table (e.g., a request to update the value for one or more attributes of the item). In embodiments, the operation coordinator 320 may apply an updated item homing rule to store an item to any number of replica tables at different regions of a global table and/or to delete an item from any number of replica tables at different regions of a global table based on receiving a request to update the item homing rule for the global table (e.g., a request to change the logical relationship and/or attribute value that the logic is to apply to, for any number of attributes of the item). In various embodiments, the operation coordinator 320 may perform any other functionality of the database service described herein (e.g., functionality of any service instance of the database service).

In some embodiments, the replication of an item to replica tables is based on the homing rule (e.g., replicating item X in response to a request to write item X to the global table) may be performed asynchronously or synchronously. In an embodiment, a client/customer may choose whether the database service is to perform replication asynchronously or synchronously (e.g., the service may receive the selection from a user via the management interface 316). In embodiments, the operation from the client may be to create a global table, add a new replica table for the global table and/or add new homing rules for the new replica, restore a replica table, or detach or remove a replica table from a global table. As shown, all of these different types of operations may be sent to the database system via the management interface, and programmatically handled by the database service (e.g., an instance of the database service).

In various embodiments, the database service validates a rule for a global table during creation of the rule by a user and/or each time the service receives a request to add an item to the global table. When a user specifies the type of value of an attribute to be evaluated by a rule, the service may verify that the same type is specified for the value of the attribute for each replica (e.g., the same type is specified for the attribute for each sub-rule across each replica). This may prevent a user from specifying a different type across different replicas for the same attribute. Similarly, each time the service receives a request to add an item to the global table, the service may first validate the request by verifying that the type for each attribute value of the item to be added is correct for the item and matches the attribute type specified in the homing rule (e.g., for every homing sub-rule). If the type for one or more of the attribute values of the item to be added is not correct, then the service may return an error message indicating the attributes that have an incorrect value type. This may ensure consistency in applying a homing rule to items and storing items across the replica tables without data type-related errors.

FIG. 4 is a flowchart illustrating a process of applying operations to replicas of a global table based on item homing rules and item attribute values, according to some embodiments. In some embodiments, the depicted process may be performed by one or more components of the database service (e.g. service instance 100 at region 1) of FIG. 1.

The process begins at operation 410, where based on user input at an instance of a database service, the instance configures a homing rule to be used for items of a global table. In some embodiments, the management operation may be the operation of FIG. 3, which may be received via the management interface of FIG. 3.

At operation 420, the instance receives a request to add an item to the global table. In embodiments, the global table includes multiple replica tables that are each located at an instance of a different region of the database service. In an embodiment, a given replica table includes multiple items and a given item includes a key and one or more attributes.

At operation 420, based at least on the homing rule and a value of an attribute(s) of the item to be added to the global table, the instance causes the item to be added to one or more of the replica tables at one or more of the regions. In embodiments, the homing rule indicates that the item is to exist at the one or more regions and that the item is not to exist at one or more other regions.

In some embodiments, if the homing rule does not match an item to be added (e.g., there is no sub-rule that matches on the attribute values of the item), then the item may be sent to one or more tables that are designated by a user to store non-matching items (e.g., based on user input to configure the service). For example, the service may receive a request to add item X to the global table. Based at least on the homing rule not matching item X, the service may cause the item to be added to any number of tables of a group of replica tables that were previously identified by a user to store items that do not match the homing rule.

In some embodiments, based on a new item that was added to the global table, the database service may add, to a change capture log, an indication of each replica table that the item was added to. This may enable a user/administrator to download and/or view the change capture log to verify that an item was replicated to the correct replica tables based on a homing rule (e.g., to assist in auditing or debugging).

Figure 5:
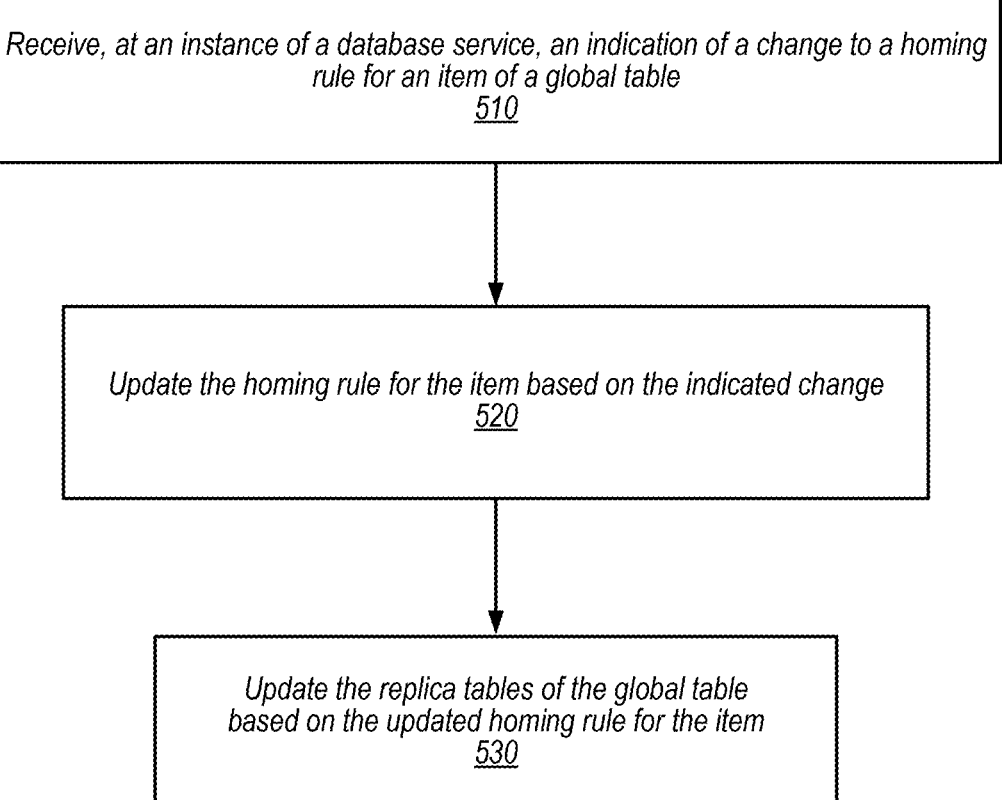
FIG. 5 is a flowchart illustrating a process of updating homing rules of a global table, according to some embodiments.

FIG. 5 is a flowchart illustrating a process of updating homing rules of a global table, according to some embodiments. In some embodiments, the processes depicted may be performed by different instances of a database service, as discussed in connection with FIGS. 1 and 3.

At operation 510, the instance receives an indication of a change to homing rules for a global table. At operation 520, the instance updates the homing rules based on the indicated change (e.g., a change to an existing homing rule, removing an existing homing rule, or adding a new homing rule). At operation 530, the instance updates one or more of the replica tables of the global table based on the updated homing rules.

Figure 6:
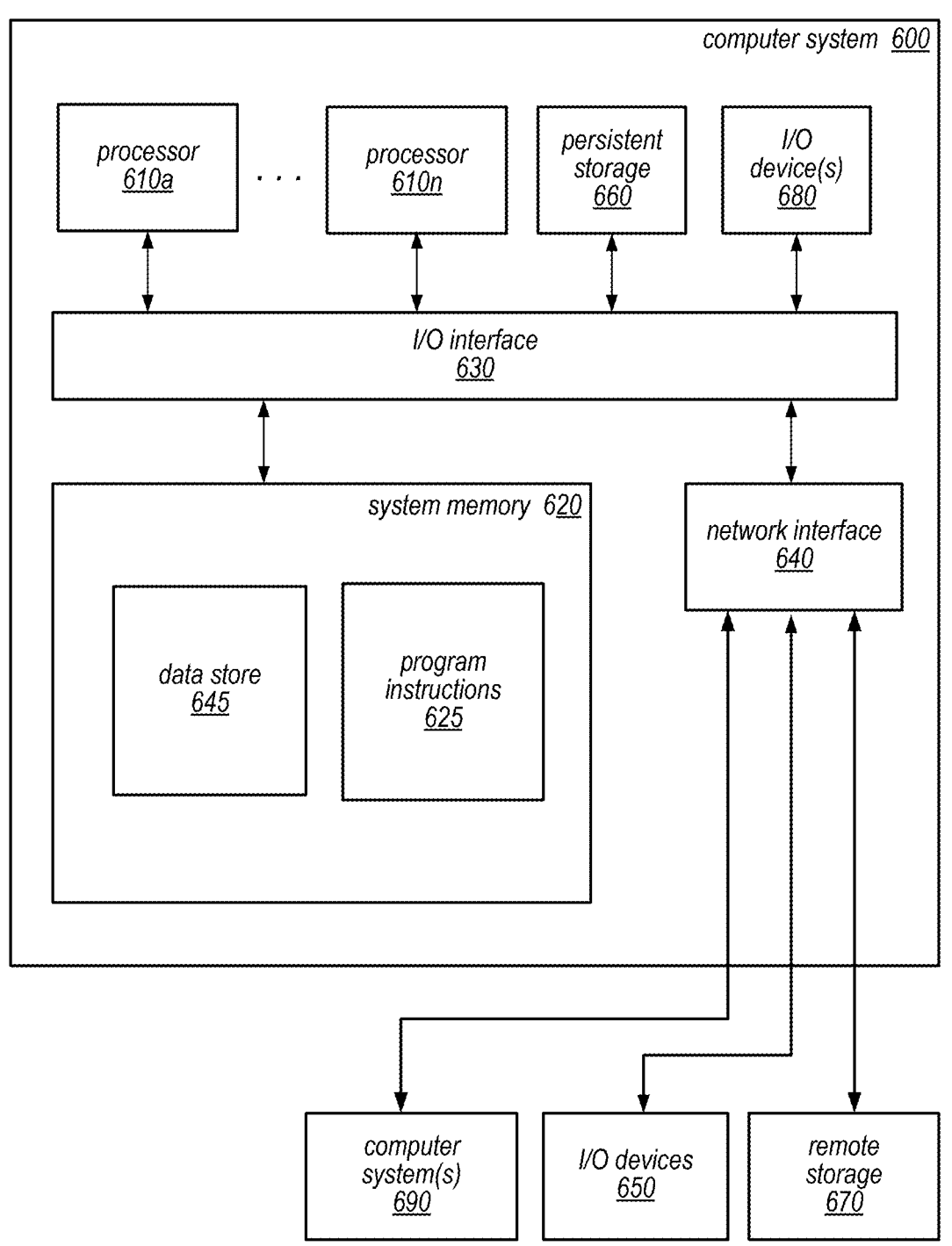
FIG. 6 is a block diagram illustrating an example computer system that can be used to implement one or more portions of a database system that implements applying operations to replicas of a global table based on item homing rules and item attribute values, according to some embodiments.

FIG. 6 is a block diagram illustrating an example computer system that may implement the techniques for applying operations to replicas of a global table based on item homing rules and item attribute values, according to various embodiments described herein. For example, computer system 600 may implement a database engine head node and/or one of a plurality of storage nodes of a separate storage system that stores homing rules, database tables, and associated metadata on behalf of clients of the database tier, in various embodiments. Computer system 600 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 600 includes one or more processors 610 (any of which may include multiple cores, which may be single or multi-threaded) coupled to a system memory 620 via an input/output (I/O) interface 630. Computer system 600 further includes a network interface 640 coupled to I/O interface 630. In various embodiments, computer system 600 may be a uniprocessor system including one processor 610, or a multiprocessor system including several processors 610 (e.g., two, four, eight, or another suitable number).

Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

The computer system 600 also includes one or more network communication devices (e.g., network interface 640) for communicating with other systems and/or components over a communications network (e.g., Internet, LAN, etc.). For example, a client application executing on system 600 may use network interface 640 to communicate with a server application executing on a single server or on a cluster of servers that implement one or more of the components of the database systems described herein. In another example, an instance of a server application executing on computer system 600 may use network interface 640 to communicate with other instances of the server application (or another server application) that may be implemented on other computer systems (e.g., computer systems 690).

In the illustrated embodiment, computer system 600 also includes one or more persistent storage devices 660 and/or one or more I/O devices 680. In various embodiments, persistent storage devices 660 may correspond to disk drives, tape drives, solid state memory, other mass storage devices, or any other persistent storage device. Computer system 600 (or a distributed application or operating system operating thereon) may store instructions and/or data in persistent storage devices 660, as desired, and may retrieve the stored instruction and/or data as needed. For example, in some embodiments, computer system 600 may host a storage system server node, and persistent storage 660 may include the SSDs attached to that server node.

Computer system 600 includes one or more system memories 620 that may store instructions and data accessible by processor(s) 610. In various embodiments, system memories 620 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

System memory 620 may contain program instructions 625 that are executable by processor(s) 610 to implement the methods and techniques described herein (e.g., various features of hybrid concurrency control for a distributed database). In various embodiments, program instructions 625 may be encoded in native binary, any interpreted language such as Java™ byte-code, or in any other language such as C/C++, Java™, etc., or in any combination thereof. In some embodiments, program instructions 625 may implement multiple separate clients, server nodes, and/or other components.

In some embodiments, program instructions 625 may include instructions executable to implement an operating system (not shown), which may be any of various operating systems, such as UNIX, LINUX, Solaris™, MacOS™, Windows™, etc. Any or all of program instructions 625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630.

A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 600 as system memory 620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 640.

In some embodiments, system memory 620 may include data store 645, which may be configured as described herein. For example, the information described herein as being stored by the database tier (e.g., on a primary node), such as a transaction log, an undo log, cached page data, or other information used in performing the functions of the database tiers described herein may be stored in data store 645 or in another portion of system memory 620 on one or more nodes, in persistent storage 660, and/or on one or more remote storage devices 670, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 645 or in another portion of system memory 620 on one or more nodes, in persistent storage 660, and/or on one or more remote storage devices 670, at different times and in various embodiments.

Similarly, the information described herein as being stored by the storage tier (e.g., redo log records, data pages, data records, and/or other information used in performing the functions of the distributed storage systems described herein) may be stored in data store 645 or in another portion of system memory 620 on one or more nodes, in persistent storage 660, and/or on one or more remote storage devices 670, at different times and in various embodiments. In general, system memory 620 (e.g., data store 645 within system memory 620), persistent storage 660, and/or remote storage 670 may store data blocks, replicas of data blocks, metadata associated with data blocks and/or their state, database configuration information, and/or any other information usable in implementing the methods and techniques described herein.

In one embodiment, I/O interface 630 may coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610).

In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may allow data to be exchanged between computer system 600 and other devices attached to a network, such as other computer systems 690 (which may implement one or more storage system server nodes, primary nodes, read-only node nodes, and/or clients of the database systems described herein), for example. In addition, network interface 640 may allow communication between computer system 600 and various I/O devices 650 and/or remote storage 670. Input/output devices 650 may, in some embodiments, include one or more display terminals, keyboards, keypads, touchpads, scanning devices, voice or optical recognition devices, or any other devices suitable for entering or retrieving data by one or more computer systems 600. Multiple input/output devices 650 may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640.

Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol. In various embodiments, computer system 600 may include more, fewer, or different components than those illustrated in FIG. 6 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network.

A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:

one or more hardware processors with associated memory that implement an instance of a database service, configured to:

receive a request to add an item comprising a plurality of attributes having corresponding values to a global table of the database service, wherein the global table comprises a plurality of replica tables that are respectively located at different instances of different regions of the database service, and wherein individual tables of the plurality of replica tables comprise a plurality of items of the global table, and wherein individual items of the plurality of items comprise a plurality of attributes having corresponding values; and based at least on the received request to add the item to the global table and on a homing rule that defines logic to be applied to the plurality of values of the plurality of attributes of the item to determine replica tables, of the plurality of replica tables, to add the item to within a first subset of the different regions, cause the item to be added to the determined replica tables located at the first subset of the different regions, wherein the item is not added to replica tables, of the plurality of replica tables, located at a second subset of the different regions, and wherein the logic of the homing rule indicates that the item is to exist at the first subset of different regions and that the item is not to exist at the second subset of different regions based on the plurality of values of the plurality of attributes of the item.

2. The system of claim 1, wherein the instance of the database service is at a first region of the database service, and wherein the instance is further configured to perform:

responsive to reception of the request to add the item to the global table, add the item to a local replica table of the instance, wherein the instance is located at a region of the different regions, and wherein, based on the plurality of values of the plurality of attributes, the homing rule indicates that the item is to exist at the region.

3. The system of claim 2, wherein to cause the item to be added to one or more of the plurality of replica tables located at one or more of the different regions, the instance of the service is configured to perform:

based at least on the homing rule and the plurality of values of the attributes of the item, replicate the item from the local replica table to the one or more replica tables located at the one or more different regions.

4. The system of claim 1, wherein the instance of the service is configured to perform:

receive a request to add another item to the global table of the database service; and based at least on the homing rule and a plurality of other values of a plurality of attributes of the other item to be added to the global table, cause the item to be added to another plurality of the replica tables that includes at least one replica table that is not present in the one or more of the plurality of replica tables that the item was added to.

5. The system of claim 1, wherein the instance of the service is further configured to perform:

receive, via an interface, an indication of a change to the homing rule;

update the homing rule based on the indicated change; and update one or more of the plurality of replica tables based on the updated homing rule.

6. A method comprising:

performing, by one or more hardware processors with associated memory implementing an instance of a database service:

receiving a request to add an item comprising a plurality of attributes having corresponding values to a global table of the database service, wherein the global table comprises a plurality of replica tables that are respectively located at different instances of different regions of the database service, and wherein individual tables of the plurality of replica tables comprise a plurality of items of the global table, and wherein individual items of the plurality of items comprise a plurality of attributes having corresponding values; and based at least on the received request to add the item to the global table and on a homing rule that defines logic to be applied to one or more values of one or more attributes of the item to determine replica tables, of the plurality of replica tables, to add the item to within a first subset of the different regions, causing the item to be added to the determined replica tables located at the first subset of the different regions, and wherein the logic of the homing rule indicates that the item is to exist at the first subset of different regions and that the item is not to exist at a second subset of the different regions based on the one or more values of the one or more attributes of the item.

7. The method of claim 6, wherein the instance of the database service is at a first region of the database service, and further comprising:

responsive to receiving the request to add the item to the global table, performing one or more of:

adding the item to a local replica table of the instance, or forwarding the request to add the item to one or more other instances of the database service at one or more other regions.

8. The method of claim 6, wherein causing the item to be added to one or more of the plurality of replica tables located at one or more of the different regions comprises:

based at least on the homing rule and the one or more values of the one or more attributes of the item, replicating the item from the local replica table to the one or more replica tables located at the one or more different regions.

9. The method of claim 6, further comprising:

receiving a request to add another item to the global table of the database service; and based at least on the homing rule and one or more other values of one or more attributes of the other item to be added to the global table, causing the other item to be added to another plurality of the replica tables that includes at least one replica table that is not present in the one or more of the plurality of replica tables that the item was added to.

10. The method of claim 6, further comprising:

receiving, via an interface, an indication of a change to the homing rule;

updating the homing rule based on the indicated change; and updating one or more of the plurality of replica tables based on the updated homing rule.

11. The method of claim 10, wherein the updating of the one or more of the plurality of replica tables comprises, for a given replica table of the one or more replica tables:

based at least on the updated homing rule and the one or more values of the one or more attributes of the item, determine whether the item is to exist at the given replica table.

12. The method of claim 6, further comprising:

receiving a request to add another item to the global table of the database service; and based at least the homing rule not matching the other item, causing the item to be added to one or more tables of a group of replica tables previously identified to store items that do not match homing rules.

13. The method of claim 6, further comprising:

adding, to a change capture log, an indication of the one or more replica tables that the item was added to.

14. The method of claim 6, wherein the homing rule defines a logical relationship between a plurality of attributes of the item, and wherein the database service applies logic, based on the homing rule, to values of the plurality of attributes to determine the one or more of the different regions to add the item to.

15. One or more non-transitory computer-accessible storage media storing program instructions that when executed on or across one or more processors of an instance of a database service, cause the database service to:

receive a request to add an item comprising a plurality of attributes having corresponding values to a global table of the database service, wherein the global table comprises a plurality of replica tables that are respectively located at different instances of different regions of the database service, and wherein individual tables of the plurality of replica tables comprise a plurality of items of the global table, and wherein individual items of the plurality of items comprise a plurality of attributes having corresponding values; and based at least on the received request to add the item to the global table and on a homing rule that defines logic to be applied to one or more values of one or more attributes of the item to determine replica tables, of the plurality of replica tables, to add the item to within a first subset of the different regions, cause the item to be added to the determined replica tables located at the first subset of the different regions, and wherein the logic of the homing rule indicates that the item is to exist at the first subset of different regions and that the item is not to exist at a second subset of the different regions based on the one or more values of the one or more attributes of the item.

16. The one or more non-transitory computer-accessible storage media of claim 15, wherein the instance of the database service is at a first region of the database service, and wherein the program instructions when executed on or across the one or more processors cause the instance to:

responsive to reception of the request to add the item to the global table, add the item to a local replica table of the instance, wherein the instance is located at a region of the different regions, and wherein, based on the one or more values of the one or more attributes, the homing rule indicates that the item is to exist at the region.

17. The one or more non-transitory computer-accessible storage media of claim 16, wherein to cause the item to be added to one or more of the plurality of replica tables located at one or more of the different regions, the program instructions when executed on or across the one or more processors cause the instance to:

based at least on the homing rule and the one or more values of the one or more attributes of the item, replicate the item from the local replica table to the one or more replica tables located at the one or more different regions.

18. The one or more non-transitory computer-accessible storage media of claim 15, wherein the program instructions when executed on or across the one or more processors cause the instance to:

receive a request to add another item to the global table of the database service; and based at least on the homing rule and one or more values of one or more attributes of the other item to be added to the global table, cause the other item to be added to another plurality of the replica tables that includes at least one replica table that is not present in the one or more of the plurality of replica tables that the item was added to.

19. The one or more non-transitory computer-accessible storage media of claim 15, wherein the program instructions when executed on or across the one or more processors cause the instance to:

receive, via an interface, an indication of a change to the homing rule;

update the homing rule based on the indicated change; and update one or more of the plurality of replica tables based on the updated homing rule.

20. The one or more non-transitory computer-accessible storage media of claim 15, wherein the program instructions when executed on or across the one or more processors cause the instance to:

add, to a change capture log, an indication of the one or more replica tables that the item was added to.

* * * * *